UNITED STATES PATENT OFFICE.

REBECCA T. SWENNING, OF DES MOINES, IOWA.

TRANSPARENT WATER-COLOR PAINT.

SPECIFICATION forming part of Letters Patent No. 432,151, dated July 15, 1890.

Application filed January 8, 1889. Serial No. 295,787. (No specimens.)

*To all whom it may concern:*

Be it known that I, REBECCA T. SWENNING, a citizen of the United States, and a resident of Des Moines, in the county of Polk and State of Iowa, have invented a Transparent Water-Color Paint, of which the following is a specification.

My object is to furnish a water-color paint specially adapted for portrait-work, and I prepare the same as follows: I dilute one package of aniline dyes, known in commerce as the "Peerless" or "Diamond" dyes, of any color desired, in one (1) ounce of distilled water, and to this I add one quart of distilled boiling water. I next dissolve one (1) ounce of powdered gum-arabic in half ($\frac{1}{2}$) an ounce of distilled water and half ($\frac{1}{2}$) an ounce of gelatine in one (1) ounce of distilled water. To these liquids I add half ($\frac{1}{2}$) an ounce of white sugar, and then boil them together rapidly for about fifteen (15) minutes. I then add three (3) ounces of alcohol and boil the liquid compound about five (5) minutes longer, and after straining the paint thus prepared by passing it twice through a suitable cloth it will be ready for immediate use or for filling into vials adapted for placing it upon the market as a new article of merchandise.

The gelatine may be omitted, but is preferably used.

The sugar adds to the adhesiveness and luster of the paint.

I am aware that all the ingredients in my composition have heretofore been used in making inks; but my manner of compounding them in proportions as required to produce an adhesive paint that has been strained and purified and that is adapted to be applied by means of a brush in painting portraits and other pictures that require delicate shading and blending of colors is novel, and my prepared water-color paint is a new article of merchandise that can be used advantageously in the art to which it pertains, because it is free from all the foreign and objectionable matter that has heretofore been mixed in compositions of a similar kind by grinding the ingredients, and pleasing effects can be produced in portrait-painting and other fine work.

I am also aware that compounds containing gelatine have been heated and filtered, and therefore do not claim the process of making a water-color paint, but a new and useful composition.

What I claim, and desire to secure by Letters Patent of the United States, is—

The herein-described composition of matter specially adapted to be used in painting portraits, consisting of aniline dyes, distilled water, gum-arabic, gelatine, white sugar, and alcohol, in the proportions specified, and in the manner set forth.

REBECCA T. SWENNING.

Witnesses:
R. H. ORWIG,
THOMAS G. ORWIG.